Sept. 22, 1970   R. A. MORGAN   3,529,789
REVERSIBLE DRIVE MEANS
Filed Aug. 1, 1968
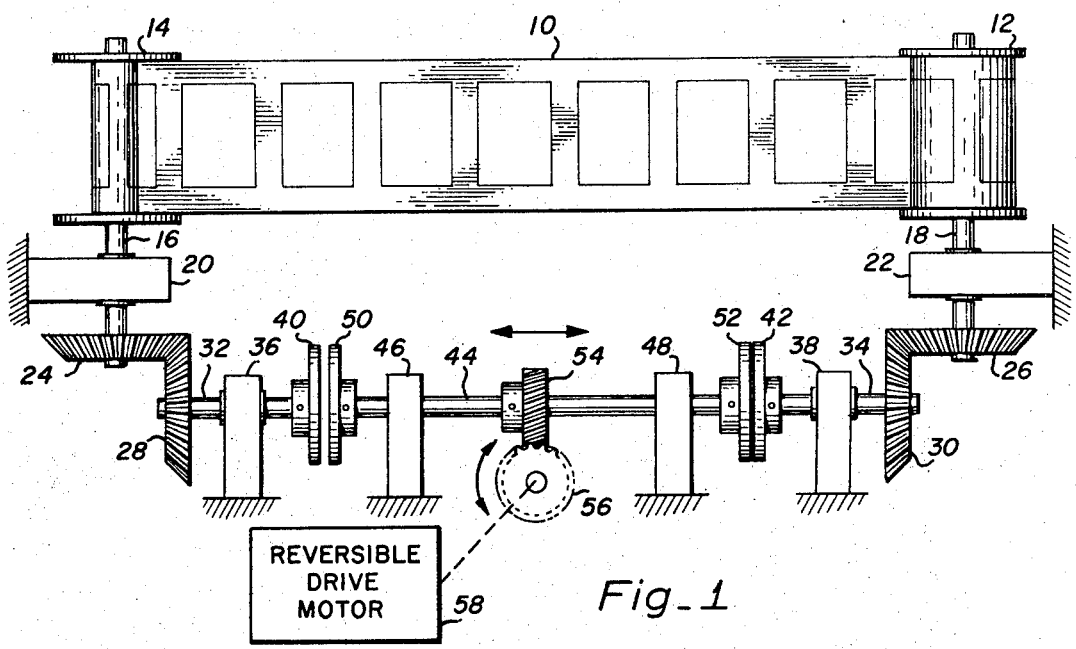
Fig_1
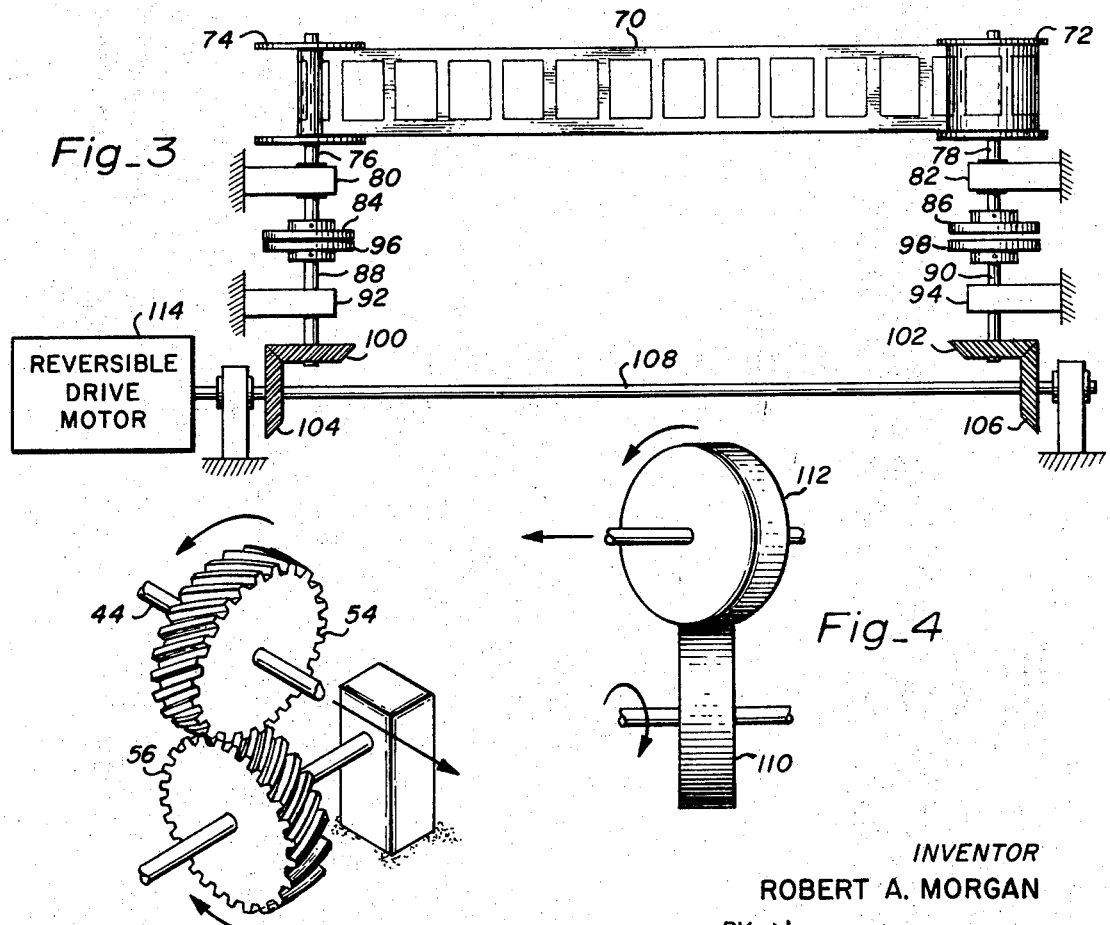
Fig_3
Fig_4
Fig_2
INVENTOR
ROBERT A. MORGAN
BY
ATTORNEY

United States Patent Office 3,529,789
Patented Sept. 22, 1970

3,529,789
REVERSIBLE DRIVE MEANS
Robert A. Morgan, Menlo Park, Calif., assignor to R. A. Morgan Co., Inc., Palo Alto, Calif., a corporation of California
Filed Aug. 1, 1968, Ser. No. 749,377
Int. Cl. B11b 15/32
U.S. Cl. 242—201                              6 Claims

ABSTRACT OF THE DISCLOSURE

A reversible drive for a film strip or the like wherein the strip may be unwound onto a take-up spool in response to a rotary input in one direction and may then be rewound back onto the storage spool in response to a rotary input in the other direction. The force transmission characteristics of a right angle spiral or helical gear drive means is employed to simultaneously apply an actuating force to a clutch means, for frictionally coupling the spool means to the drive means, and rotary energy to the appropriate spool means through the clutch means.

STATEMENT OF THE INVENTION

The invention relates generally to a reversible web driving mechanism and, more particularly, to a reversible film reader drive mechanism for enabling the selective positioning of a film strip or the like in alignment with a viewing window or source of illumination in response to a simple bi-directional rotary input.

DESCRIPTION OF THE PRIOR ART

Heretofore many forms of bi-directional web transport apparatus have been developed for use in the various types of devices wherein a long strip of a particular type of material having indicia incorporated along the length thereof is used to perform a particular function. Notable among these types of devices are those such as magnetic tape recording apparatus, video tape recording apparatus, machine or process control punched tape devices, various types of advertising apparatus and many types of transparent film transport apparatus.

In some of these devices, such as in the microfilm viewing machines and similar devices, it is desirable that drive means be provided which are mechanically simple but allow for rapid bi-directional web transport in response to a single mechanical or electromechanical input control function. For example, in the case of microfilm viewing apparatus, it is necessary that means be provided so that a viewer can quickly locate a particular segment of the film by causing it to be advanced onto a take-up spool or to be rewound onto its storage spool by merely actuating a mechanical or electrical control switch.

Among the early prior art devices of the type generally similar in structure to the present invention, which will be described in detail hereinafter, is that disclosed in the U.S. patent to Hamel No. 1,719,606. In this device a film strip is caused to be intermittently and completely unwound and then rewound repeatedly so long as rotary energy in a single direction is applied to the input thereof. An axially slidable drive shaft means is caused to drive first one film reel and then the other by means of lugs secured at either end of the film strip and which engage the drive shaft and cause it to be driveably repositioned when the film is fully unwound in either direction. Although suitable for certain types of applications, this type of film transport is not suitable for use in modern microfilm reading apparatus since it requires the film to be fully wound or unwound before its direction can be changed.

A more recent drive system for microfilm viewing apparatus is disclosed by Klein in U.S. Pat. No. 3,280,491. In this device a driving bevel gear is manually positioned to engage either of two driven bevel gears attached to a spool drive means such that when the driving gear engages one of the driven gears, the spools are driven in one direction and when it is repositioned and caused to engage the other bevel gear, the spools are driven in the opposite direction. Here, as in other prior art devices, a control function in addition to the rotary input is required, and the direction of the strip advance is not directly related to the direction of the rotational input.

Although prior art devices such as these perform the ultimate function of changing the position of a film strip or the like, there are certain advantages which could be obtained if the drive train could be shifted from one spool to the other merely in response to the changing of the rotary direction of the drive means.

OBJECTS OF THE INVENTION

It is therefore a principal object of the present invention to provide a reversible drive apparatus for a microfilm transport means or the like wherein either of two film carrying spools can alternately be driven in predetermined directions by merely changing the direction of rotation of the drive means.

Another object of the present invention is to provide a reversible drive apparatus for a microfilm transport means or the like wherein the film may be bi-directionally transported in response to the simple bi-directional rotation of a single driving means.

Still another object of the present invention is to provide a novel reversible drive means for a web transport means or the like wherein a drive train can be selectively connected to drive either of two web carrying spools by simply reversing the rotary direction of the prime mover.

Still other objects of the present invention will become apparent after a reading of the following detailed description which makes reference to the accompanying drawing.

BRIEF DESCRIPTION OF THE DRAWING

FIG. 1 is a schematic diagram of a bi-directional drive apparatus in accordance with the present invention;

FIG. 2 illustrates the basic operating principle of the bi-directional drive system shown in FIG. 1;

FIG. 3 is an alternative embodiment of a bidirectional drive apparatus in accordance with the present invention; and FIG. 4 illustrates an alternative drive means for use in accordance with the present invention.

DESCRIPTION OF THE PREFERRED EMBODIMENT

Referring now to FIG. 1 of the drawing, there is shown an illustrative embodiment of a bi-directional drive mechanism for selectively positioning a film strip 10 in front of a suitable viewing window or a source of light for image projection. Film strip 10 is initially loaded on a supply spool or reel 12, and the loose end is threaded onto a take-up reel 14 which includes any suitable type of film receiving or attachment means. The spools 12 and 14 are driveably received by a pair of drive shafts 16 and 18 which are rotatably mounted through a pair of support members 20 and 22 respectively.

Bevel gears 24 and 26 are affixed to the ends of the drive shafts 16 and 18 and form parts of the two right angle drive means which include another pair of bevel gears 28 and 30 fixedly mounted to the ends of another pair of shafts 32 and 34 which are disposed at right angles to the drive shafts 16 and 18. A pair of shafts 32 and 34 are likewise rotatably mounted in a pair of support members 36 and 38 and terminate at their other extremity with a pair of clutch plates 40 and 42 secured thereto. Shafts 32 and 34 are disposed in axial alignment with each other and are restrained from moving in the axial direction.

Disposed between the friction faces of the clutch plates 40 and 42 and in alignment with the axes of the shafts 32 and 34 is still another shaft means 44 which is rotatably mounted through a pair of spaced support members 46 and 48 and is readily displaceable in its axial direction. Affixed to the ends of the shaft means 44 are clutch plates 50 and 52 for engaging respectively the clutch plates 40 and 42. The distance between the engaging faces of plates 50 and 52 is typically chosen such that it is slightly less than the distance separating the faces of clutch plates 40 and 42. Thus, when the shaft 44 is shifted leftwardly so that the friction face of plate 50 engages the friction face of plate 40, there is a slight separation between the friction faces of plates 42 and 52. In some instances, however, it may be desirable that the tolerance between the respective plates be so small as to cause a drag force to be applied between the plates of the non-driven coupling, thus partially restraining the rotation of the spool from which the film is being unwound.

In order to permit the shaft 44 to be simultaneously driven both axially and rotationally, a helical gear means 54 is secured to the shaft 44 at a suitable point between the support members 46 and 48. A second helical gear means 56 is positioned to engage the gear 54 with the axes of rotation of the respective gears being oriented 90 degrees apart as shown. A suitable reversible drive motor 58 (or manual crank means) is provided for imparting rotary energy to the gear 56 in a selected direction.

It will be seen that by causing the gear 56 to be driven in the clockwise direction not only will the gear 54 and shaft 44 be caused to rotate, but the assembly mounted to and including the shaft 44 will be displaced rightwardly so that the frictional face of plate 52 engages that of plate 42, and consequently, causes the spool 12 to be driven in its rewinding direction. On the other hand, by causing the gear 56 to be rotated counterclockwise, the gear 54 is rotated in the opposite direction, and the drive assembly, including shaft 44, is driven leftwardly so as to cause the clutch plates 40 and 50 to engage and drive the spool 14 in its take-up direction.

It is well known that helical gears can be employed to provide a 90-degree translation of rotary energy. It is likewise known that a component of the force transmitted from the drive gear 56 to a driven gear 54 disposed 90 degrees relative thereto is in a direction parallel to the axis 44 of the driven gear 54, as is shown in FIG. 2. In most devices utilizing helical gears, the shaft 44 of the driven gear is journaled so as to restrain any movement in the axial direction. However, in the instant application of this particular type of gear drive, advantage is taken of the axial force so as to simultaneously provide a clutching and declutching action for causing one of the spools to be frictionally driven and the other to be disengaged. Whereas in certain similar prior art apparatus both a rotational and an axial force must be input to the system in order to shift the drive from one spool to the other, the present invention only requires a simple bi-directional rotational input in order to produce a bi-directional transport of the film 10.

Referring now to FIG. 3 of the drawing, an alternate embodiment of the invention will be described. The film strip 70 is attached to a storage reel 72 and a take-up reel 74 which are respectively mated to the ends of the drive shafts 76 and 78. The shafts 76 and 78 are rotatably mounted, but axially restrained, in the mounting brackets 80 and 82, and have affixed to their other ends clutch plates 84 and 86 respectively. Disposed in axial alignment with the shafts 76 and 78 are a pair of shafts 88 and 90 which are rotatably mounted in the supports 92 and 94 and which allow the shafts freedom of movement in the axial direction.

At the upper ends of the shafts 88 and 90 a pair of friction plates 96 and 98 are secured for engagement with the plates 84 and 86. In their normal undriven position the plates 96 and 98 are typically disposed so as to have little if any contact with the plates 84 and 86. A pair of spiral bevel gears 100 and 102 are fixedly secured to the other ends of the shafts 88 and 90, and are positioned so as to engage a pair of spiral bevel gears 104 and 106 which are mounted on a main drive shaft 108. The main drive shaft 108 is rotatably mounted in a pair of brackets 110 and 112, and is secured therein against movement in the axial direction. In order to drive the shaft 108 a manual crank means or reversible motor means 114 is coupled thereto.

The operation of this embodiment is quite similar to the previously described embodiment of FIG. 1 in that when the drive shaft 108 is driven in the clockwise direction, for example, the meshing of the spiral gear 104 with gear 100 causes, in addition to the rotary motion, a thrust to be exerted in the axial direction of shaft 88. The pitch of the spiral gears is chosen so that the thrust is in the direction which causes the frictional surfaces of plates 84 and 96 to be forced into contact, thus transmitting to spool 74, through the frictional engagement, a rotary driving force which causes the film 70 to be wound thereon.

The other set of gears 102 and 106 are pitched in a direction such that clockwise motion of the shaft 108, while imparting rotary motion to shaft 90, causes an axial thrust to be applied thereto in the downward direction, thus allowing the spool 72 to more or less freewheel so as to permit the film 70 to unwind. In the case where it is desirable that a drag be applied to the unwinding spool 72, means might be provided for retaining the plates 86 and 98 in partial engagement. For example, spring means for biasing the shafts 88 and 90 upwardly with a predetermined force would provide a suitable drag applying means which would tend to restrict the downward displacement of the friction plates 86 and 88 caused by the spiral gear force transmission characteristics.

When the drive means 114 is energized to cause rotation of the shaft 108 in the counter-clockwise direction, the reverse action occurs and friction plate 98 engages plate 86 so as to drive the spool 72 in such direction as to cause the film 70 to be rewound thereon. Thus, as in the first described embodiment utilizing helical gear means, advantage is taken of the transmission characteristics of the spiral gear means so as to apply both rotary as well as translational energy to a portion of the drive train. By virtue of such an arrangement a means has been provided which can selectively drive either of the two film transporting spools in response to simple rotary input motion.

As still another modification, the axial thrust applying rotary drive component may comprise a pair of resilient roller members mounted so as to engage each other at an acute angle such as is shown in FIG. 4. One can readily see the functional similarity of this embodiment to that illustrated in FIG. 2, for example. When rotary motion, as shown, is applied to roller 110 which is restrained against movement in the axial direction, roller 112 is caused to rotate in the direction illustrated, and, as a result of the direction at which the frictional surfaces engage one another, a force component in the axial direction is likewise applied to the roller 112 causing it to be urged in that direction.

While the invention has been described with particular reference to the several specific embodiments, it is apparent that many more alterations and modifications may be made to the apparatus without departing from the merits of the invention. It is therefore to be understood that this description is for purposes of illustration only, and is in no way intended to be of a limiting nature. Furthermore, I intend that the appended claims be interpreted as covering all alterations and modifications which can be considered to fall within the true spirit and scope of my invention.

What is claimed is:

1. A reversible drive mechanism for enabling the selective positioning of a filmstrip or the like comprising:
   first and second spool members respectively having the ends of said filmstrip attached thereto so that said filmstrip may be selectively wound or unwound thereon;
   a first drive train means for transmitting rotary energy to said first spool member so as to drive the same in a predetermined direction, said first drive train means including a first friction member at the energy input end thereof;
   a second drive train means for transmitting rotary energy to said second spool member so as to drive the same in a predetermined direction, said second drive train means including a second friction member at its energy input end;
   energy transmission means operatively disposed between said first and second friction members and including a pair of similar friction members for engaging said first and second friction members for transmitting rotary energy thereto, said energy transmission being displaceable so as to cause one of said pair of friction members to engage one of said first or second friction members when so displaced;
   energy conversion means coupled to said transmission means, said conversion means including axially fixed friction drive means and axially displaceable friction drive means enegaged thereby, said conversion means converting simple rotary motion in said fixed drive means into both rotary and translational energy in said displaceable drive means, said translational energy being used to drive said similar friction members either into or out of engagement with said first and second friction members; and
   input means for applying to said fixed drive means simple bi-directional rotational energy for causing said filmstrip to be driven in one direction in response to a clockwise input and in the other direction in response to a counter-clockwise input.

2. A reversible drive mechanism as recited in claim 1 wherein said fixed drive means includes a first helical gear means and said displaceable drive means includes a second helical gear means disposed in engaging relationship with and at right angles to said first gear means, said second gear means forming a part of said energy transmission means and said first gear means imparting both rotary and translational energy to said transmission means through said second gear means.

3. A reversible drive mechanism as recited in claim 1 wherein said axially fixed drive means includes two spaced apart spiral bevel drive gear means commonly rotated in response to a single rotary input and said displaceable drive means includes two spiral bevel driven gear means each engaging one of said drive gear means and each being coupled to one of said spool means through said friction members, said gear means being oppositely polarized so that one engaging set causes engagement of one pair of said friction members in response to a clockwise rotation of said rotary input while the other causes engagement of the other pair of said friction members in response to a counter-clockwise rotation of said rotary input.

4. A reversible drive mechanism as recited in claim 1 wherein said axially fixed friction drive means and said axially displaceable friction drive means are comprised of a pair of resiliently engaging wheel means the axes of which are skewed relative to one another so that the frictional force transmitted from said axially fixed drive means to said displaceable drive means has a component in the axial direction as well as in the tangential direction of said displaceable drive means.

5. A bi-directional drive means for selectively positioning a web, or the like, the extremities of which are received upon a pair of spool members mounted in spaced relation to each other, comprising:
   a pair of shafts disposed at right angles to each other;
   helical gear means disposed on each of said shafts, one of said gear means forming an axially fixed drive gear and the other of said gear means forming an axially displaceable driven gear, the shaft supporting said driven gear being mounted to permit both rotation and axial translation thereof;
   first clutch means coupling one end of said supporting shaft to one of said spool members;
   second clutch means coupling the other end of said supporting shaft to the other of said spool members;
   said drive gear being disposed relative to said driven gear so as to impart both rotation and axial translation in a first set of directions to said driven gear in response to rotation of said drive gear in one direction, said axial translation causing one of said clutch means to engage and drive one of said spool means; and
   said drive gear being capable of imparting both rotation and axial translation to said driven gear in another set of directions in response to rotation of said drive gear in the other direction, said axial translation causing the other of said clutch means to engage the other of said clutch means and drive the other of said spool means.

6. A bi-directional web transport means for selectively positioning a filmstrip or the like, comprising:
   first shaft means for driveably receiving a first spool means upon which said filmstrip is initially wound;
   second shaft means for driveably receiving a second spool means upon which said filmstrip may be wound;
   first and second spiral bevel drive gear means and first and second spiral bevel driven gear means respectively driven by said first and second spiral bevel drive means, said first and second spiral bevel drive gear means being mounted on input shaft means to which bi-directional rotary input energy may be supplied;
   first and second selectively engageable clutch means for respectively coupling said first and second shaft means to said first and second driven gear means; and
   said first and second driven gear means being arranged so as to receive from said first and second drive gear means respectively, axially directed components of force as well as tangentially directed components of force, said axially directed components of force received by said first and second drive gear means being oppositely directed so as to cause one of said clutch means to be driveably engaged when said input shaft means is rotated in one direction and to cause the other of said clutch means to be driveably engaged when said input shaft means is rotated in the other direction.

References Cited
UNITED STATES PATENTS

| | | |
|---|---|---|
| 1,482,802 | 2/1924 | Lewis. |
| 1,812,433 | 6/1931 | Duncan et al. _____ 242—67.4 |
| 2,401,937 | 6/1946 | Kingson. |
| 2,600,153 | 6/1952 | Breitenstein _____ 242—67.4 X |
| 2,624,214 | 1/1953 | Arensberg _____ 242—201 X |
| 3,095,157 | 6/1963 | Nichols _____ 242—67.4 |

NATHAN L. MINTZ, Primary Examiner

PO-1050
(5/69)

UNITED STATES PATENT OFFICE
CERTIFICATE OF CORRECTION

Patent No. 3,529,789   Dated September 22, 1970

Inventor(s) Robert A. Morgan

It is certified that error appears in the above-identified patent and that said Letters Patent are hereby corrected as shown below:

Column 5; line 25; after "mission" insert --means--;

Column 5, line 32; correct spelling of "enegaged".

SIGNED AND
SEALED
DEC 29 1970

(SEAL)
Attest:

Edward M. Fletcher, Jr.
Attesting Officer

WILLIAM E. SCHUYLER, JR.
Commissioner of Patents